United States Patent
Lee et al.

(10) Patent No.: US 11,417,018 B2
(45) Date of Patent: Aug. 16, 2022

(54) DEVICE AND METHOD FOR CALIBRATING CAMERA FOR VEHICLE

(71) Applicant: SK TELECOM CO., LTD., Seoul (KR)

(72) Inventors: Taekyeong Lee, Seoul (KR); Seongsoo Lee, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 0 days.

(21) Appl. No.: 17/055,963

(22) PCT Filed: Nov. 14, 2018

(86) PCT No.: PCT/KR2018/013915
§ 371 (c)(1),
(2) Date: Nov. 16, 2020

(87) PCT Pub. No.: WO2019/221349
PCT Pub. Date: Nov. 21, 2019

(65) Prior Publication Data
US 2021/0366154 A1    Nov. 25, 2021

(30) Foreign Application Priority Data
May 17, 2018    (KR) .................. 10-2018-0056646

(51) Int. Cl.
*G06T 7/00*    (2017.01)
*G06T 7/80*    (2017.01)
(Continued)

(52) U.S. Cl.
CPC .............. *G06T 7/80* (2017.01); *B60R 11/04* (2013.01); *G01S 19/53* (2013.01);
(Continued)

(58) Field of Classification Search
CPC ............. G06T 7/80; G06T 2207/30256; G06T 2207/30244; G06T 2207/30252;
(Continued)

(56) References Cited

U.S. PATENT DOCUMENTS

| 2008/0007619 A1* | 1/2008 | Shima ...................... G06T 7/80 348/118 |
| 2009/0010630 A1* | 1/2009 | Higashihara ............. G06T 7/80 396/50 |

(Continued)

FOREIGN PATENT DOCUMENTS

| JP | 2001-331787 A | 11/2001 | |
| JP | 2001331787 | * 11/2001 | ............... G06T 1/00 |
| JP | 2017-143417 A | 8/2017 | |

OTHER PUBLICATIONS

PCT International Search Report and Written Opinion, PCT Application No. PCT/KR2018/013915, dated Feb. 20, 2019, 10 pages (with English translation of International Search Report).

*Primary Examiner* — Md K Talukder
(74) *Attorney, Agent, or Firm* — Fenwick & West LLP

(57) ABSTRACT

In accordance with an aspect of the present disclosure, there is provided a method of calibrating a camera for a vehicle, comprising: obtaining attitude angle information of the vehicle by using a traveling direction of the vehicle obtained based on a satellite signal, and a vertical direction from ground obtained based on a high definition map; obtaining attitude angle information of the camera mounted on the vehicle by matching an image captured by the camera to the high definition map; and obtaining coordinate system transformation information between the vehicle and the camera by using the attitude angle information of the vehicle and the attitude angle information of the camera.

14 Claims, 8 Drawing Sheets

(51) Int. Cl.
*B60R 11/04* (2006.01)
*G01S 19/53* (2010.01)
*G06V 20/58* (2022.01)
*G06V 20/56* (2022.01)

(52) U.S. Cl.
CPC . *B60R 2300/10* (2013.01); *G06T 2207/30256* (2013.01); *G06V 20/582* (2022.01); *G06V 20/588* (2022.01)

(58) Field of Classification Search
CPC . G06T 7/41; G06T 2207/30248; B60R 11/04; B60R 2300/10; B60R 2300/402; G01S 19/53; G01S 5/163; G01S 19/52; G06V 20/582; G06V 20/588; B60W 40/02; B60W 2420/42
See application file for complete search history.

(56) References Cited

U.S. PATENT DOCUMENTS

| | | | |
|---|---|---|---|
| 2015/0254853 A1* | 9/2015 | Tanaka | G06T 7/73 348/148 |
| 2018/0292201 A1* | 10/2018 | Sakano | H04N 5/232 |
| 2018/0365859 A1* | 12/2018 | Oba | G06T 7/85 |
| 2019/0051030 A1* | 2/2019 | Choi | H04N 5/247 |
| 2020/0271449 A1* | 8/2020 | Sakano | B60R 1/00 |
| 2021/0199437 A1* | 7/2021 | Breed | G06N 3/02 |
| 2021/0366154 A1* | 11/2021 | Lee | B60W 40/02 |

\* cited by examiner

DEVICE AND METHOD FOR CALIBRATING CAMERA FOR VEHICLE

CROSS-REFERENCE TO RELATED APPLICATION

This application claims priority to Korean Patent Application No. 10-2018-0056646, filed on May 17, 2018. The entire contents of the application on which the priority is based are incorporated herein by reference.

TECHNICAL FIELD

The present disclosure relates to a device for calibrating a camera for a vehicle and a method thereof which perform calibration of the camera mounted on the vehicle.

BACKGROUND

In general, a vehicle indicates a transportation device traveling a road or a track using fossil fuel, electricity, and the like as a power source.

The vehicle has been developed to provide various functions to a driver according to development of technologies. Particularly, according to a trend of vehicle electrification, a vehicle with an Active Safety System (ASS) which operates to prevent an accident immediately before or at the time of the accident has appeared.

Further, in recent years, to alleviate burdens on the driver and enhance convenience of the driver, researches into a vehicle with an Advanced Driver Assistance System (ADAS) which actively provides driving environment information such as a condition of the vehicle, a condition of the driver, and a surrounding environment are being actively conducted.

The ADAS may include a sensing means for detecting the driving environment, and an example of the sensing means may include a camera. The camera may be mounted outside or inside the vehicle and may detect the driving environment by obtaining an image corresponding to a position and an attitude angle at which the camera is mounted.

SUMMARY

As described above, since a camera obtains an image corresponding to a position and an attitude angle at which the camera is mounted, a camera coordinate system may be recognized in order to control a vehicle based on the obtained image. To this end, by using a recognition pattern for correction or by recognizing a position of a vanishing point based on a traffic lane in a driving environment, the position and the attitude angle at which the camera is mounted on the vehicle may be obtained. However, in case of using the recognition pattern for correction, since an additional pre-calibration process is required, changes in the position of the camera may not be reflected while the vehicle traveling, and in case of recognizing the position of the vanishing point, accuracy is degraded.

Accordingly, the present disclosure provides a technology that obtains attitude angle information of the camera mounted on the vehicle by using a high definition map, thereby obtaining coordinate system transformation information for transforming a coordinate system between the vehicle and the camera.

In addition, when the above-described technology is performed, the present disclosure provides a technology for accurately obtaining the attitude angle information of the camera in real time.

In accordance with an aspect of the present disclosure, there is provided a method of calibrating a camera for a vehicle, comprising: obtaining attitude angle information of the vehicle by using a traveling direction of the vehicle obtained based on a satellite signal, and a vertical direction from ground obtained based on a high definition map; obtaining attitude angle information of the camera mounted on the vehicle by matching an image captured by the camera to the high definition map; and obtaining coordinate system transformation information between the vehicle and the camera by using the attitude angle information of the vehicle and the attitude angle information of the camera.

In accordance with another aspect of the present disclosure, there is provided a device for calibrating a camera for a vehicle, comprising: a vehicle attitude angle information acquisition unit configured to obtain attitude angle information of the vehicle by using a traveling direction of the vehicle obtained based on a satellite signal, and a vertical direction from ground obtained based on a high definition map stored in advance; a camera attitude angle information acquisition unit configured to obtain attitude angle information of the camera mounted on the vehicle by matching an image captured by the camera to the high definition map; and a coordinate system transformation information acquisition unit configured to obtain coordinate system transformation information between the vehicle and the camera by using the attitude angle information of the vehicle and the attitude angle information of the camera.

A device for calibrating the camera for the vehicle and a method thereof according to one embodiment may accurately obtain the position and the attitude angle at which the camera is mounted without the additional pre-calibration process. Further, by performing camera calibration in real time while the vehicle traveling, it is possible to reflect the changes in the position and the attitude angle of the camera that may occur while the vehicle traveling, thereby increasing accuracy of the camera calibration.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
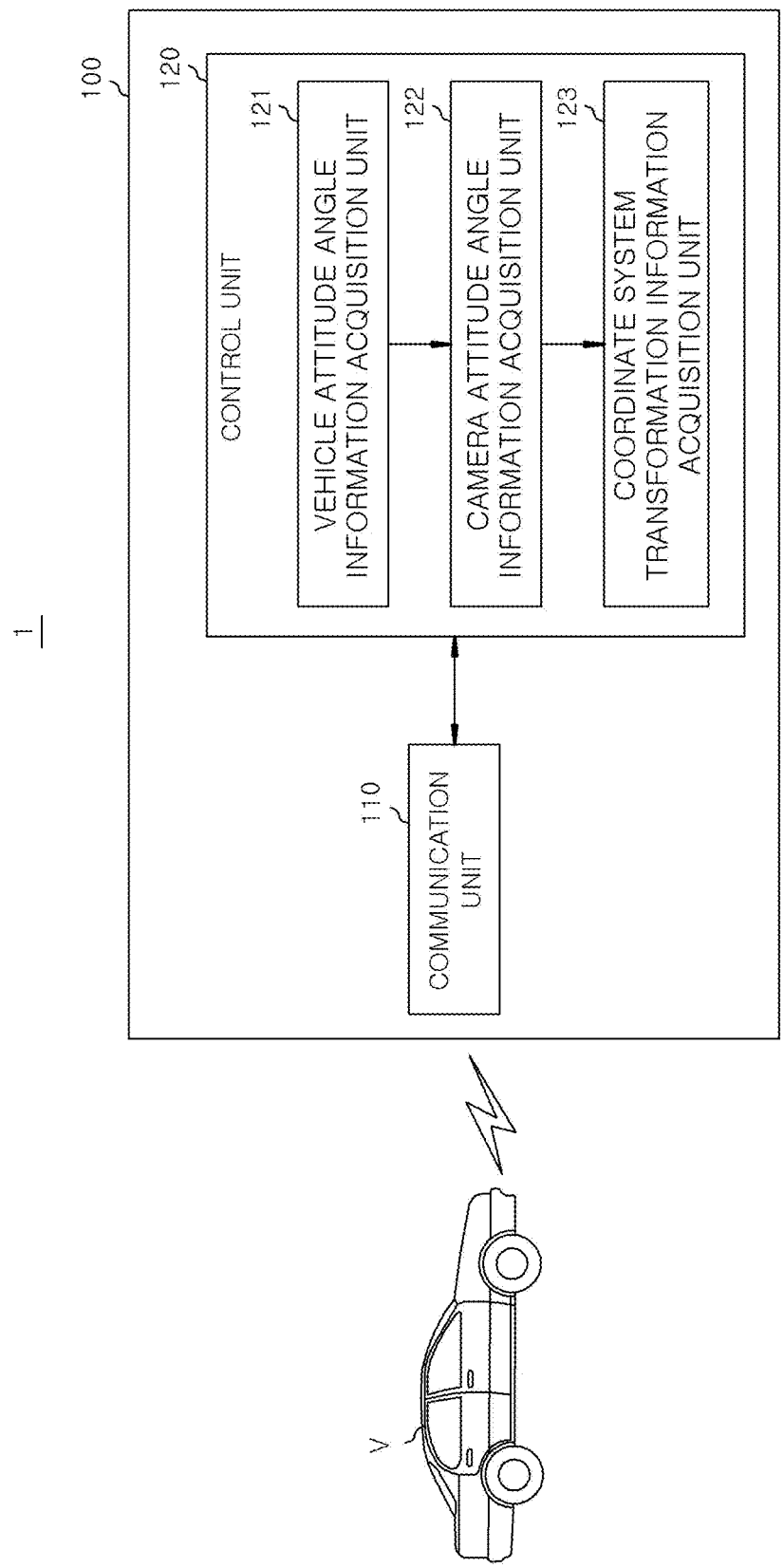
FIG. 1 shows a control block diagram of a system for calibrating a camera for a vehicle according to one embodiment.
Figure 2:
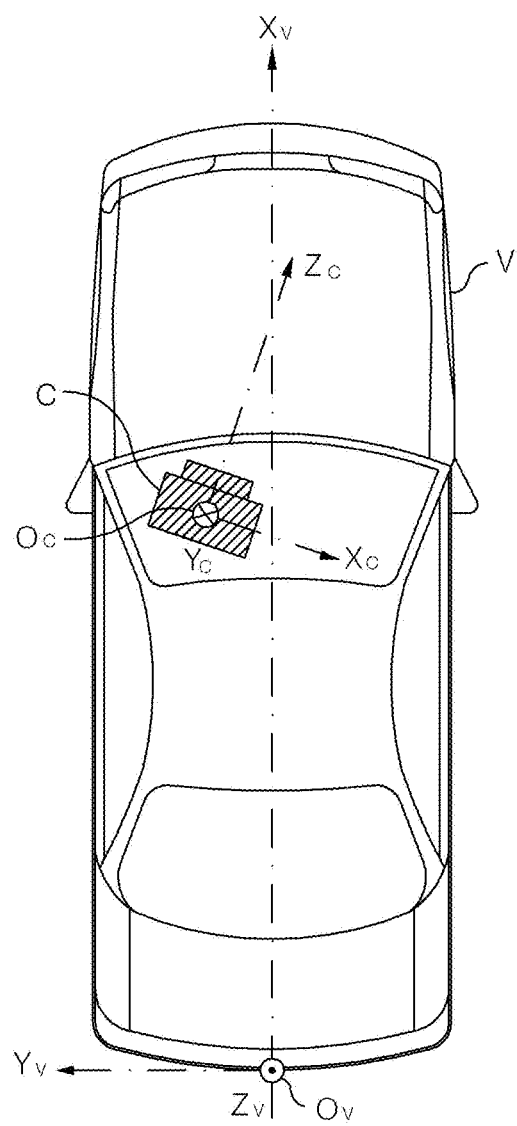
FIG. 2 shows a diagram illustrating a vehicle coordinate system and a camera coordinate system according to one embodiment.

FIG. 1 shows a control block diagram of a system 1 for calibrating a camera C for a vehicle V according to one embodiment, and FIG. 2 shows a diagram illustrating a vehicle coordinate system and a camera coordinate system according to one embodiment.

The system 1 for calibrating the camera C for the vehicle V according to one embodiment may include the vehicle V and a device 100 for calibrating the camera C for the vehicle V.

The vehicle V may indicate a transportation means capable of moving humans, objects, or animals from one location to another location while traveling along a road or a track. The vehicle V according to one embodiment may include a vehicle with three wheels or four wheels, a vehicle with two wheels such as a motorcycle and the like, a construction machine, a motor bicycle, a bicycle, and a train running on the track, and the like.

The vehicle V of FIG. 1 may include a Global Position System (GPS) module, thereby receiving a satellite signal including navigation data from at least one GPS satellite. The vehicle V may obtain a current location of the vehicle V and a traveling direction of the vehicle V based on the satellite signal.

Further, the vehicle V illustrated in FIG. 1 may store a high definition map in advance. Herein, the high definition map may indicate a map that has high accuracy for safe and accurate control over the vehicle V, and may include information on an altitude, slope, curvature, and the like, as well as a flat position of the road. In addition, the high definition map may further include road facilities such as traffic lanes, traffic signs, traffic lights, and a guardrail.

Furthermore, the vehicle V illustrated in FIG. 1 may include an Advanced Driver Assistance System (ADAS). Herein, the ADAS may indicate a system that provides driving environment information such as a condition of the vehicle V, a condition of a driver, and surrounding environment information or actively controls the vehicle V to reduce a burden on the driver and enhance convenience of the driver.

The ADAS included in the vehicle V may include a sensing means for detecting a driving environment of the vehicle V. The sensing means according to one embodiment may include radar which detects the driving environment by emitting a pulse around the vehicle V and receiving an echo pulse reflected from an object positioned in a corresponding direction, LiDAR which emits a laser around the vehicle V and receives an echo laser reflected from an object positioned in a corresponding direction, and/or an ultrasonic sensor which emits an ultrasonic wave around the vehicle V and receives an echo ultrasonic wave reflected from an object positioned in a corresponding direction, and the like.

Further, the ADAS may include the camera C as the sensing means. The camera C may be provided to face forward, sideways, and/or rearward from the vehicle V, thereby capturing an image in a corresponding direction. The captured image may be a basis for obtaining information on the traffic lane or the traffic sign, or the like, as well as an object around the vehicle V through image processing.

On the other hand, the vehicle V may combine image information obtained by the camera C and Controller Area Network (CAN) data such as wheel rotation information and yaw rate information transmitted through a CAN communication method which is a communication method between internal modules of the vehicle V, thereby controlling the vehicle V. At this time, while the image information obtained by the camera C may follow the camera coordinate system, the CAN DATA may follow the vehicle coordinate system.

FIG. 2 shows a rough floor plan of the vehicle V according to one embodiment illustrating the vehicle coordinate system of the vehicle V and the camera coordinate system of the camera C mounted on the vehicle V. Referring to FIG. 2, the vehicle V may have the vehicle coordinate system including an $O_v$ as an origin, an $X_v$ axis in the traveling direction of the vehicle V, a $Z_v$ axis in a vertical direction from ground, and a $Y_v$ axis perpendicular to the $X_v$ axis and the $Z_v$ axis. On the other hand, the camera C mounted on the vehicle V may have the camera coordinate system including an $O_c$ as an origin, and an $X_c$ axis, a $Y_c$ axis, and a $Z_c$ axis that are determined according to a position and an attitude angle at which the camera C is mounted. In order to combine two pieces of information each on the different coordinate system, unification of the coordinate systems, which is called camera calibration, may be performed.

To this end, the camera calibration may be performed before the vehicle travels. Specifically, an image regarding a recognition pattern for correction may be obtained by using the camera mounted on the vehicle, and the attitude angle and the position at which the camera is mounted may be obtained by using the obtained image regarding the recognition pattern for the correction. In this case, it is cumbersome that performing the camera calibration as a preliminary work, and it is difficult to reflect changes in the position and the attitude angle of the camera that may occur during traveling of the vehicle.

Alternatively, the traffic lane may be recognized through the camera during traveling of the vehicle, and the attitude angle of the camera may be obtained by identifying a position of a vanishing point based on the recognized traffic lane. However, in a situation such as a curved road in which the vanishing point of the traffic lane is not accurately extracted, it is difficult to apply a method using the vanishing point, and accuracy is inferior to a method performed manually.

To solve the problem, the system 1 for calibrating the camera C for the vehicle V according to one embodiment of the present disclosure may provide a coordinate system transformation information for transforming the coordinate system between the vehicle V and the camera C by using the satellite signal received by the vehicle V, the image captured by the camera C and the high definition map.

Referring to FIG. 1, the device 100 for calibrating the camera C for the vehicle V according to one embodiment may communicate with the vehicle V by wire or wirelessly. The device 100 for calibrating the camera C for the vehicle V may receive the satellite signal, the image, and the like from the vehicle V, and may provide the coordinate system transformation information to the vehicle V. Specifically, the device 100 for calibrating the camera C for the vehicle V according to one embodiment may include a communication unit 110 for communicating with the vehicle V; and a control unit 120 for obtaining the coordinate system transformation information.

The communication unit 110 may exchange information by communicating with the vehicle V in various publicly known communication methods. The communication unit 110 according to one embodiment may communicate with the vehicle V through a base station by adopting a publicly known communication method such as CDMA, GSM, W-CDMA, TD-SCDMA, WiBro, LTE, EPC, and the like. Alternatively, the communication unit 110 according to another embodiment may communicate with the vehicle V within a predetermined distance by adopting a communication method such as a wireless LAN, Wi-Fi, Bluetooth, Zigbee, Wi-Fi Direct (WFD), Ultra-Wide Band (UWB), Infrared Data Association (IrDA), Bluetooth Low Energy (BLE), and Near Field Communication (NFC), and the like. However, the method in which the communication unit 110 communicates with the vehicle V is not limited to the embodiments described above.

The control unit 120 may obtain the satellite signal received from vehicle V by communication unit 110, the image captured by the camera C, and the like, and may obtain the position and the attitude angle information of the camera C by using the received satellite signal, the image, and the like to provide to the vehicle V. The position where the camera C is mounted may be determined by an actual measured value input from an outside or by an internal operation of the control unit 120. Accordingly, hereinafter, a case that the control unit 120 obtains the attitude angle information of the camera C, and provides the coordinate system transformation information to the vehicle V by using the attitude angle information will be described in detail.

The control unit 120 may include a vehicle attitude angle information acquisition unit 121 for obtaining the attitude angle information of the vehicle V, a camera attitude angle information acquisition unit 122 for obtaining the attitude angle information of the camera C, and a coordinate system transformation information acquisition unit 123 for obtaining the coordinate system transformation information.

The vehicle attitude angle information acquisition unit 121 may obtain the attitude angle information of the vehicle V by using the traveling direction of the vehicle V obtained based on the satellite signal and the vertical direction from the ground obtained based on the high definition map.

Hereinafter, referring to FIG. 3, a method of obtaining the attitude angle information of the vehicle V will be described in detail.

Figure 3:
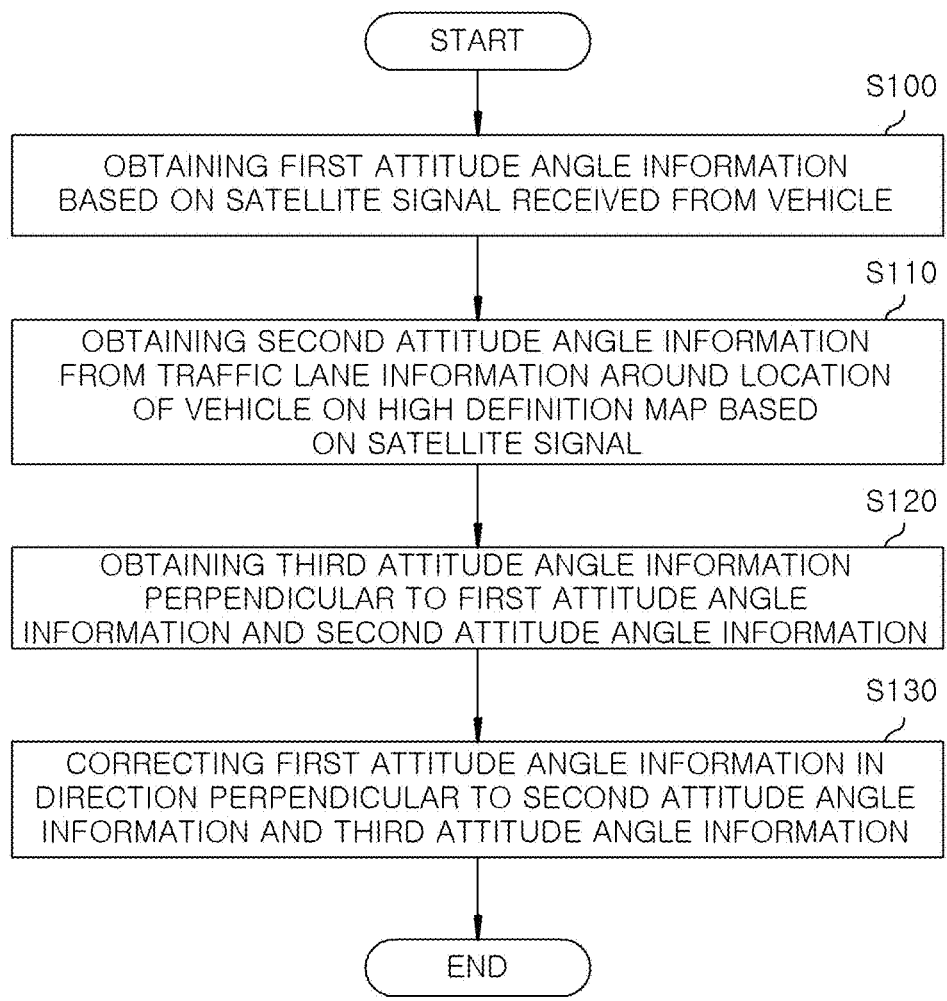
FIG. 3 shows a flowchart illustrating a method of obtaining attitude angle information of a vehicle according to one embodiment.

FIG. 3 shows a flowchart illustrating a method of obtaining attitude angle information of the vehicle V according to one embodiment.

First, in a step S100, the vehicle attitude angle information acquisition unit 121 may obtain first attitude angle information based on a satellite signal received from the vehicle V. Specifically, the vehicle attitude angle information acquisition unit 121 may obtain a traveling direction based on satellite signals at consecutive times when the vehicle V travels straight in a course in which the vehicle V may receive the satellite signal stably.

To increase accuracy of the obtained traveling direction, the vehicle attitude angle information acquisition unit 121 according to one embodiment may increase an interval between the consecutive times. Otherwise, the vehicle attitude angle information acquisition unit 121 may obtain traveling directions repeatedly, and average a plurality of the obtained traveling directions or combine the plurality of the obtained traveling directions through an algorithm such as a Kalman filter.

Alternatively, the vehicle attitude angle information acquisition unit 121 may increase the accuracy of the obtained traveling direction by combining, through the Kalman filter, the satellite signal received by the vehicle V and yaw rate information among CAN data of the vehicle V.

Since the obtained traveling direction of the vehicle V corresponds to the $X_v$ axis of the vehicle coordinate system illustrated in FIG. 2, the vehicle attitude angle information acquisition unit 121 may obtain the traveling direction of the vehicle V obtained based on the satellite signal as the first attitude angle information.

Herein, a case in which the vehicle attitude angle information acquisition unit 121 directly obtains the traveling direction of the vehicle V based on the satellite signal has been described, however, the vehicle attitude angle information acquisition unit 121 may receive the traveling direction of the vehicle V that is obtained by the vehicle V based on the satellite signal.

Then, in a step S110, the vehicle attitude angle information acquisition unit 121 may obtain second attitude angle information which is a vertical direction from ground from traffic lane information around a location of the vehicle V on a high definition map based on the satellite signal. Specifically, the vehicle attitude angle information acquisition unit 121 may obtain, from the high definition map, the traffic lane information around the location of the vehicle V based on the satellite signal, for example, an area within a predetermined range from the location of the vehicle V. If two or more than two traffic lanes are on a left side and a right side from the location of the vehicle V in the received traffic lane information, the vehicle attitude angle information acquisition unit 121 may extract a plane on which the traffic lanes exists together, and may obtain a vertical direction from the plane.

Herein, a case in which the vehicle attitude angle information acquisition unit 121 obtains the second attitude angle information by receiving the high definition map from the vehicle V has been described, however, the vehicle attitude angle information acquisition unit 121 may obtain the second attitude angle information by using the high definition map stored by the vehicle attitude angle information acquisition unit 121.

The vehicle attitude angle information acquisition unit 121 according to one embodiment may obtain covariance of distribution of vertices on the plane, and then may determine an eigenvector corresponding to a minimum eigenvalue according to eigenvalue decomposition as the vertical direction from the plane. In this case, the vehicle attitude angle information acquisition unit 121 may determine that the determined vertical direction is reliable if a ratio of the minimum eigenvalue and a consecutive eigenvalue is greater than a reference value.

Since the obtained vertical direction from the ground corresponds to the $Z_v$ axis of the vehicle coordinate system illustrated in FIG. 2, the vehicle attitude angle information acquisition unit 121 may obtain the vertical direction from the ground as the second attitude angle information.

When the first attitude angle information and the second attitude angle information are obtained, in a step S120, the vehicle attitude angle information acquisition unit 121 may obtain third attitude angle information perpendicular to the first attitude angle information and the second attitude angle information. Specifically, the vehicle attitude angle information acquisition unit 121 may obtain a perpendicular direction to the first attitude angle information and the second attitude angle information by performing a cross product of the second attitude angle information and the first attitude angle information.

Since the obtained perpendicular direction corresponds to the $Y_v$ axis of the vehicle coordinate system illustrated in FIG. 2, the vehicle attitude angle information acquisition unit 121 may obtain the perpendicular direction to the first attitude angle information and the second attitude angle information as the third attitude angle information.

On the other hand, the first attitude angle information and the second attitude angle information may not be perpendicular to each other due to an error inherent in the satellite signal. Accordingly, in a step S130, the vehicle attitude angle information acquisition unit 121 may correct the first attitude angle information in a direction perpendicular to the second attitude angle information and the third attitude angle information. If the second attitude angle information obtained from the high definition map is correct, since the second attitude angle information and the third attitude angle information are perpendicular to each other, the first attitude angle information may be corrected by using the second attitude angle information and the third attitude angle information.

Specifically, the vehicle attitude angle information acquisition unit 121 may obtain the perpendicular direction to the second attitude angle information and the third attitude angle information by performing the cross product of the third attitude angle information and the second attitude angle information, and may correct the first attitude angle information in the obtained perpendicular direction.

Through the above-described process, the vehicle attitude angle information acquisition unit 121 may obtain a rotation matrix for attitude angle information of the vehicle V. The rotation matrix for the attitude angle information of the vehicle V follows Equation 1.

$$R_{w,v} = [\vec{x}_{w,v} \vec{y}_{w,v} \vec{z}_{w,v}] \quad \text{[Equation 1]}$$

Herein, $R_{w,v}$ may indicate the rotation matrix for the attitude angle information of the vehicle V, $\vec{x}_{w,v}$ may indicate the $X_v$ axis according to the first attitude angle information, and $\vec{y}_{w,v}$ may indicate the $Y_v$ axis according to the third attitude angle information, $\vec{z}_{w,v}$ may indicate the $Z_v$ axis according to the second attitude angle information.

On the other hand, the vehicle attitude angle information acquisition unit 121 may obtain the attitude angle information of the vehicle V through a method different from the method illustrated in FIG. 3. The vehicle attitude angle information acquisition unit 121 according to another embodiment may estimate the traveling direction of the vehicle V on a X-Y plane by combining the satellite signal received by the vehicle V with the CAN data such as wheel rotation information and yaw rate information of the vehicle V. Since a z-coordinate of the estimated travel direction of the vehicle V may be hard to identify, the vehicle attitude angle information acquisition unit 121 may obtain a z-coordinate of the first attitude angle information in which an inner product of the second attitude angle information obtained according to the method illustrated in FIG. 3 and the estimated traveling direction of the vehicle V is zero. Finally, the vehicle attitude angle information acquisition unit 121 may obtain the third attitude angle information through the cross product of the second attitude angle information and the first attitude angle information.

Referring to FIG. 1 again, when the attitude angle information of the vehicle V is obtained, the camera attitude angle information acquisition unit 122 may obtain the attitude angle information of the camera C mounted on the vehicle V by matching the high definition map to the image captured by the camera C.

Hereinafter, a method of obtaining the attitude angle information of the camera C will be described in detail with reference to FIGS. 4 through 8.

Figure 4:
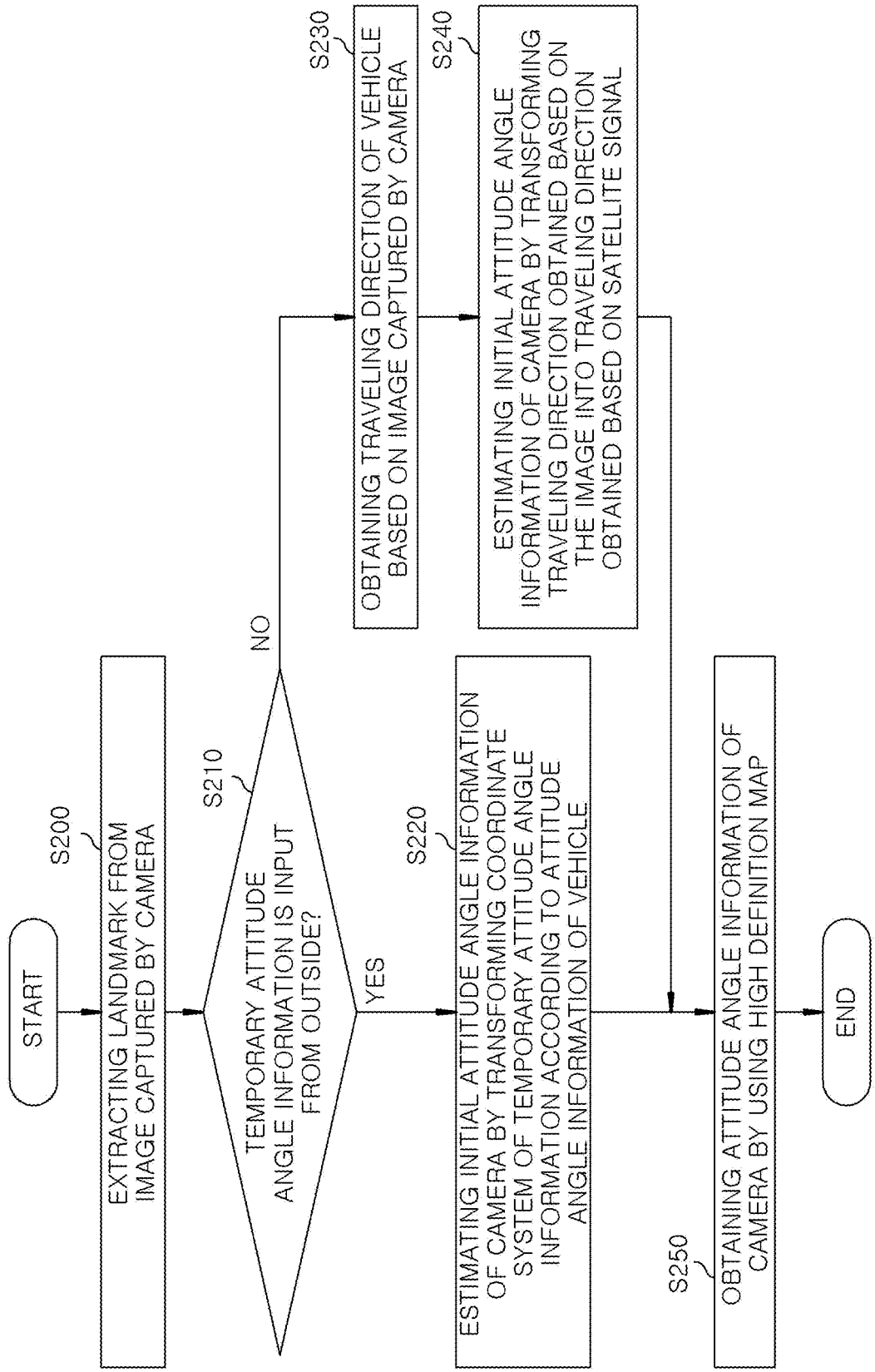
FIG. 4 shows a flowchart illustrating a method of obtaining attitude angle information of a camera according to one embodiment.
Figure 5:
FIG. 5 shows a diagram illustrating a result of extracting a landmark from an image captured by a camera according to one embodiment.

FIG. 4 shows a flowchart illustrating a method of obtaining attitude angle information of the camera C according to one embodiment, and FIG. 5 shows a diagram illustrating a result of extracting a landmark from an image captured by the camera C according to one embodiment.

First, in a step S200, the camera attitude angle information acquisition unit 122 may extract the landmark from the image captured by the camera C. Herein, the landmark may indicate a structure for identifying a driving environment, and may include, for example, a traffic lane, a traffic sign, a road stud, a traffic light, a guard rail, and the like. To this end, the camera attitude angle information acquisition unit 122 may use an ADAS or may employ a machine learning technique such as deep learning.

Referring to FIG. 5, the camera attitude angle information acquisition unit 122 may extract, from the image captured by the camera C, a landmark $L_{l1}$ for a traffic lane in front of the vehicle V, landmarks $L_{l2}$ for a bicycle-only road sign and a two-wheeled vehicle prohibition sign on a right side, and a landmark $L_{l3}$ for a road signpost at a distance ahead.

Then, in a step S210, the camera attitude angle information acquisition unit 122 may identify whether temporary attitude angle information is input from an outside. Herein, the temporary attitude angle information may indicate a value input from the outside as rough attitude angle information of the camera C based on a vehicle coordinate system.

If the temporary attitude angle information is input, in a step S220, the camera attitude angle information acquisition unit 122 may estimate initial attitude angle information of the camera C by transforming a coordinate system of the temporary attitude angle information according to attitude angle information of the vehicle V. Specifically, the camera attitude angle information acquisition unit 122 may estimate the initial attitude angle information of the camera C by transforming coordinates of the temporary attitude angle information through a rotation matrix for the attitude angle information of the vehicle V obtained by the vehicle attitude angle information acquisition unit 121. This may be an initial value of a process of obtaining the attitude angle information of the camera C, which will be described later.

On the other hand, if the temporary attitude angle information is not input, in a step S230, the camera attitude angle information acquisition unit 122 may obtain a traveling direction of the vehicle V based on the image captured by the camera C. Specifically, the camera attitude angle information acquisition unit 122 may obtain a trajectory that the camera C moves from consecutive images captured by the camera C. To this end, the camera attitude angle information acquisition unit 122 according to one embodiment may apply visual odometry.

Then, in a step S240, the camera attitude angle information acquisition unit 122 may estimate the initial attitude angle information of the camera C by transforming the traveling direction obtained based on the image into a traveling direction obtained based on a satellite signal. Since a roll angle rather than a pitch angle and a yaw angle of the camera C is uncertain while the vehicle V travels straight forward, the camera attitude angle information acquisition unit 122 may estimate the initial attitude angle information of the camera C based on the correct pitch angle, the correct yaw angle, and the uncertain roll angle.

Finally, in a step S250, the camera attitude angle information acquisition unit 122 may obtain the attitude angle information of the camera C by using a high definition map.

Hereinafter, a method of obtaining the attitude angle information of the camera C by using the high definition map will be described in detail with reference to FIGS. 6 through 8.

Figure 6:
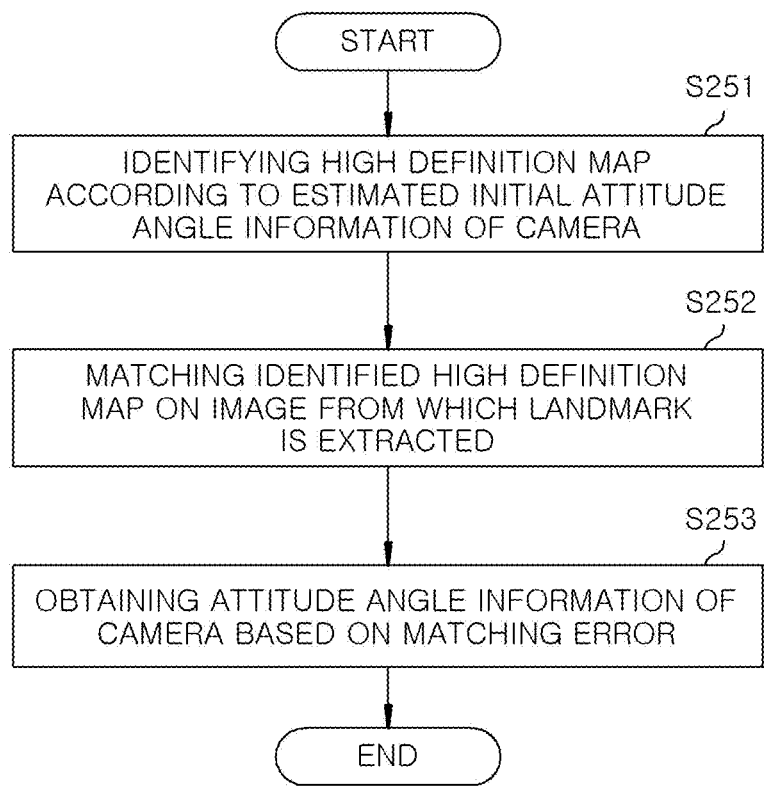
FIG. 6 shows a detailed flowchart illustrating a method of obtaining attitude angle information of a camera by using a high definition map according to one embodiment.
Figure 7:
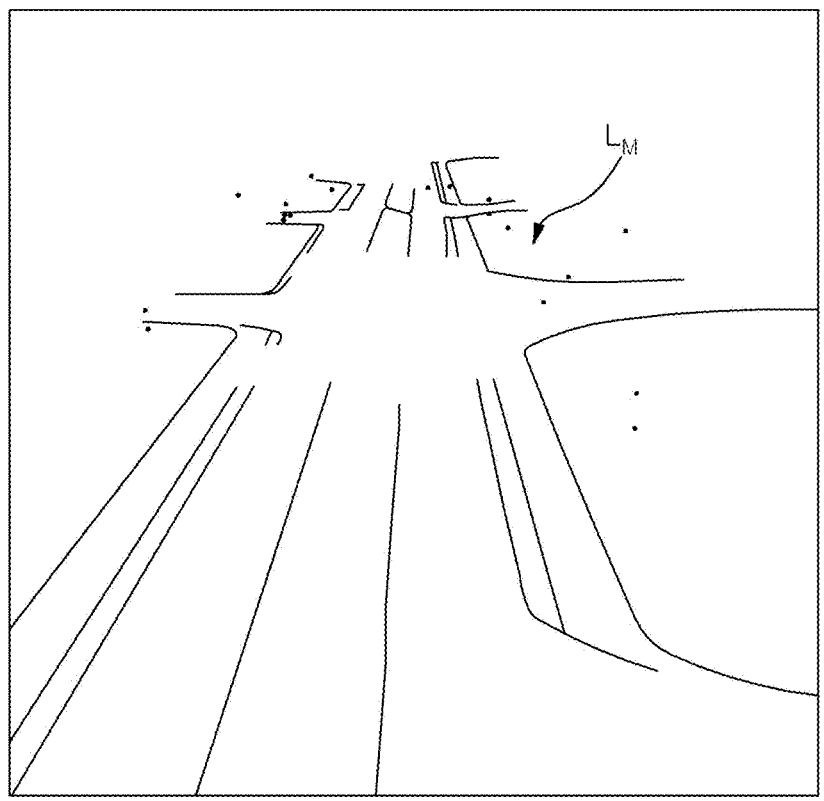
FIG. 7 shows a diagram illustrating a high definition map corresponding to initial attitude angle information of a camera according to one embodiment.
Figure 8:
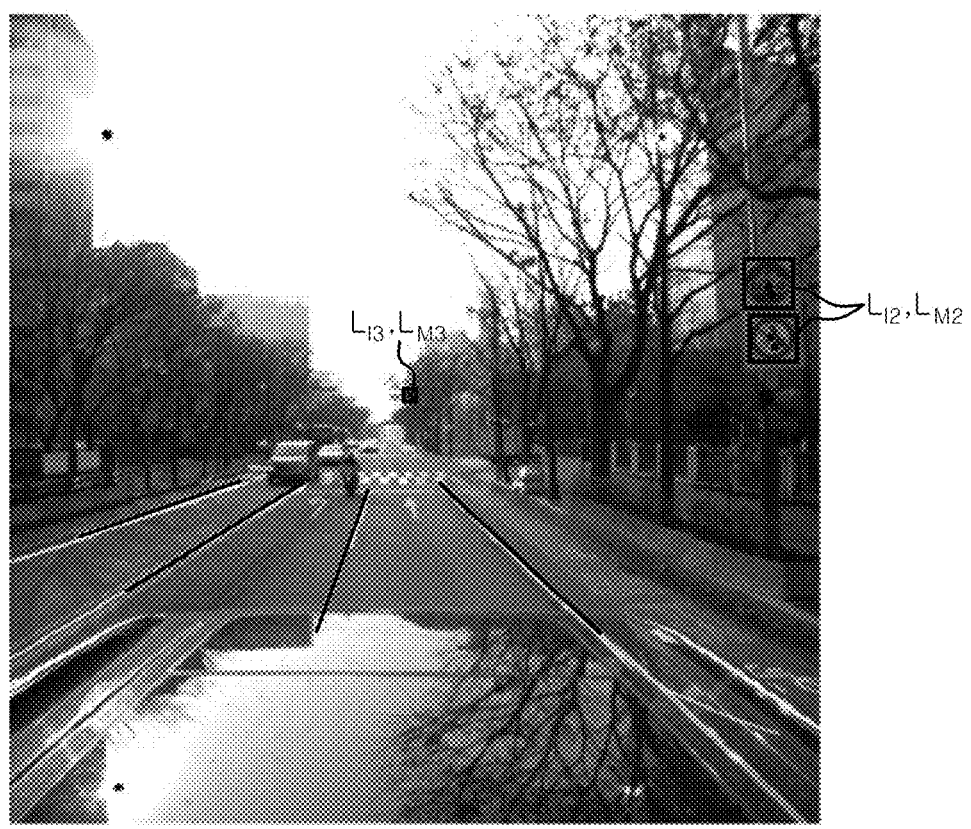
FIG. 8 shows a diagram illustrating a result of matching the high definition map illustrated in FIG. 7 to the image illustrated in FIG. 5.

FIG. 6 shows a detailed flowchart illustrating a method of obtaining attitude angle information of the camera C by using a high definition map according to one embodiment, FIG. 7 shows a diagram illustrating the high definition map corresponding to initial attitude angle information of the camera C according to one embodiment, and FIG. 8 shows a diagram illustrating a result of matching the high definition map illustrated in FIG. 7 with the image illustrated in FIG. 5.

Referring to FIG. 6, first, in a step S251, the camera attitude angle information acquisition unit 122 may identify the high definition map according to the estimated initial attitude angle information of the camera C. Referring to FIG. 7, a landmark $L_M$ identified by the camera C according to the initial attitude angle information of the camera C may be displayed on the high definition map. Specifically, it may be identified that the landmark $L_M$ such as a road, a traffic lane, and a traffic sign, and the like is displayed on the high definition map.

Then, in a step S252, the camera attitude angle information acquisition unit 122 may match the identified high definition map on an image from which a landmark is extracted. In this case, the camera attitude angle information acquisition unit 122 may apply an algorithm such as Iterative Closest Point (ICP).

Finally, in a step S253, the camera attitude angle information acquisition unit 122 may obtain the attitude angle information of the camera C based on a matching error. Specifically, the camera attitude angle information acquisition unit 122 may obtain the matching error between the landmark on the image and the landmark on the high definition map, and then obtain an attitude angle with the minimum matching error as the attitude angle information of the camera C. Herein, the matching error may indicate a difference between pixels.

Referring to FIG. 8, it may be identified that the high definition map illustrated in FIG. 7 is matched on the image from which the landmark is extracted illustrated in FIG. 5. Specifically, each of the landmark $L_{I1}$ for the traffic lane, the landmarks $L_{I2}$ for the traffic signs, and the landmark $L_{I3}$ for the road signpost in the image illustrated in FIG. 5 may be matched with corresponding landmarks $L_{M11}$, $L_{M2}$, and $L_{M3}$ on the high definition map respectively. At this time, it may be identified that there is almost no matching error for the traffic lane between the image and the high definition map. The camera attitude angle information acquisition unit 122 may obtain an attitude angle having the matching error as illustrated in FIG. 8 as the attitude angle information of the camera C.

On the other hand, since there is a possibility that a local minimum occurs depending on an initial value in the algorithm such as the ICP, if the initial value is uncertain, the camera attitude angle information acquisition unit 122 may use a converged result so that the matching error is decreased by applying the ICP, while changing the initial value to a surroundings, to the changed initial value.

Referring to FIG. 1 again, the coordinate system transformation information acquisition unit 123 may obtain the coordinate system transformation information between the vehicle V and the camera C by using the attitude angle information of the vehicle V obtained by the vehicle attitude angle information acquisition unit 121 and the attitude angle information of the camera C obtained by the camera attitude angle information acquisition unit 122. Specifically, the coordinate system transformation information acquisition unit 123 may follow Equation 2.

$$R_{v,c}=(R_{w,v})^{-1}R_{w,c} \quad \text{[Equation 2]}$$

Herein, $R_{v,c}$ may indicate the attitude angle information of the camera C based on the vehicle coordinate system as the coordinate system transformation information, $R_{w,v}$ may indicate a rotation matrix for the attitude angle information of the vehicle V, and $R_{w,c}$ may indicate a translation matrix for the attitude angle information of the camera C.

The control unit 120 may transmit the coordinate system transformation information obtained by the coordinate system transformation information acquisition unit 123 to the vehicle V through the communication unit 110, and the vehicle V may transform the coordinate system of the image captured by the camera C by using the received coordinate system transformation information. Alternatively, the vehicle V may transform the CAN data obtained at the vehicle V to the camera coordinate system by applying the received coordinate system transformation information in reverse.

The device 100 for calibrating the camera C for the vehicle V and a method thereof according to the above-described embodiments may accurately obtain the position and the attitude angle at which the camera C is mounted without an additional pre-calibration process. Further, by performing the camera calibration in real time during traveling of the vehicle V, it is possible to reflect changes in the position and the attitude angle of the camera C which may occur during traveling of the vehicle V, thereby increasing the accuracy of the camera calibration.

On the other hand, each of the steps included in the method of calibrating the camera C for the vehicle V according to one embodiment described above may be implemented in the computer-readable recording medium for storing the computer program programmed to perform each of the steps.

According to one embodiment, the above-described device 100 for calibrating the camera C for the vehicle V and the method thereof may be used in various fields such as a home or an industrial site, and thus have industrial applicability.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. A method of calibrating a camera for a vehicle, comprising:
obtaining attitude angle information of the vehicle by using a traveling direction of the vehicle obtained based on a satellite signal, and a vertical direction from ground obtained based on a high definition map by at least:

obtaining a first attitude angle information that is the traveling direction of the vehicle, based on the satellite signal received from the vehicle, obtaining a second attitude angle information that is the vertical direction from the ground, from traffic lane information around a position of the vehicle based on the satellite signal on the high definition map, and obtaining a third attitude angle information that is perpendicular to the traveling direction of the vehicle and the vertical direction from the ground;

obtaining attitude angle information of the camera mounted on the vehicle by matching an image captured by the camera to the high definition map; and obtaining coordinate system transformation information between the vehicle and the camera by using the attitude angle information of the vehicle and the attitude angle information of the camera.

2. The method of calibrating the camera for the vehicle of claim 1, wherein the obtaining the attitude angle information of the vehicle further includes:

correcting the first attitude angle information in a direction perpendicular to the second attitude angle information and the third attitude angle information.

3. The method of calibrating the camera for the vehicle of claim 1, wherein the obtaining the attitude angle information of the camera includes:

estimating initial attitude angle information of the camera by transforming a coordinate system of temporary attitude angle information input from an outside, based on the attitude angle information of the vehicle;

matching the high definition map corresponding to the estimated initial attitude angle information of the camera to the captured image; and obtaining the attitude angle information of the camera, based on a matching error between a landmark on the captured image and the high definition map.

4. The method of calibrating the camera for the vehicle of claim 1, wherein the obtaining the attitude angle information of the camera includes:

obtaining a traveling direction of the vehicle based on the image captured by the camera;

matching the traveling direction of the vehicle obtained based on the image to the traveling direction of the vehicle obtained based on the satellite signal received from the vehicle;

matching the high definition map corresponding to the matched traveling direction of the vehicle to the captured image; and obtaining the attitude angle information of the camera based on a matching error between a landmark on the captured image and the high definition map.

5. The method of calibrating the camera for the vehicle of claim 1, further comprising:

transforming a coordinate system of the image captured by the camera mounted on the vehicle, by using the obtained coordinate system transformation information.

6. A device for calibrating a camera for a vehicle, comprising:

a vehicle attitude angle information acquisition unit configured to obtain attitude angle information of the vehicle by using a traveling direction of the vehicle obtained based on a satellite signal, and a vertical direction from ground obtained based on a high definition map stored in advance, the vehicle attitude angle information acquisition unit is further configured to:

obtain a first attitude angle information that is the traveling direction of the vehicle, based on the satellite signal received from the vehicle, obtain a second attitude angle information that is the vertical direction from the ground, from traffic lane information around a position of the vehicle based on the satellite signal on the high definition map, and obtain a third attitude angle information that is perpendicular to the traveling direction of the vehicle and the vertical direction from the ground;

a camera attitude angle information acquisition unit configured to obtain attitude angle information of the camera mounted on the vehicle by matching an image captured by the camera to the high definition map; and a coordinate system transformation information acquisition unit configured to obtain coordinate system transformation information between the vehicle and the camera by using the attitude angle information of the vehicle and the attitude angle information of the camera.

7. The device for calibrating the camera for the vehicle of claim 6, wherein the vehicle attitude angle information acquisition unit is further configured to:

correct the first attitude angle information in a direction perpendicular to the second attitude angle information and the third attitude angle information.

8. The device for calibrating the camera for the vehicle of claim 6, wherein the camera attitude angle information acquisition unit is further configured to:

estimate initial attitude angle information of the camera by transforming a coordinate system of temporary attitude angle information input from an outside, based on the attitude angle information of the vehicle, match the high definition map corresponding to the estimated initial attitude angle information of the camera to the captured image, and obtain the attitude angle information of the camera, based on a matching error between a landmark on the captured image and the high definition map.

9. The device for calibrating the camera for the vehicle of claim 6, wherein the camera attitude angle information acquisition unit is further configured to:

obtain a traveling direction of the vehicle based on the image captured by the camera, match the obtained traveling direction of the vehicle to the traveling direction of the vehicle obtained based on the satellite signal received from the vehicle, match the high definition map corresponding to the matched traveling direction of the vehicle to the captured image, and obtain the attitude angle information of the camera based on a matching error between a landmark on the captured image and the high definition map.

10. A non-transitory computer-readable storage medium for storing computer program programmed to perform a method of calibrating a camera for a vehicle, comprising:

obtaining attitude angle information of the vehicle by using a traveling direction of the vehicle obtained based on a satellite signal, and a vertical direction from ground obtained based on a high definition map by at least:

obtaining a first attitude angle information that is the traveling direction of the vehicle, based on the satellite signal received from the vehicle, obtaining a second attitude angle information that is the vertical direction from the ground, from traffic lane information around a position of the vehicle based on the satellite signal on the high definition map, and obtaining a third attitude angle information that is perpendicular to the traveling direction of the vehicle and the vertical direction from the ground;

obtaining attitude angle information of the camera mounted on the vehicle by matching an image captured by the camera to the high definition map; and obtaining coordinate system transformation information between the vehicle and the camera by using the attitude angle information of the vehicle and the attitude angle information of the camera.

11. The non-transitory computer-readable storage medium of claim 10, wherein the obtaining the attitude angle information of the vehicle further includes:

correcting the first attitude angle information in a direction perpendicular to the second attitude angle information and the third attitude angle information.

12. The non-transitory computer-readable storage medium of claim 10, wherein the obtaining the attitude angle information of the camera includes:

estimating initial attitude angle information of the camera by transforming a coordinate system of temporary attitude angle information input from an outside, based on the attitude angle information of the vehicle;

matching the high definition map corresponding to the estimated initial attitude angle information of the camera to the captured image; and obtaining the attitude angle information of the camera, based on a matching error between a landmark on the captured image and the high definition map.

13. The non-transitory computer-readable storage medium of claim 10, wherein the obtaining the attitude angle information of the camera includes:

obtaining a traveling direction of the vehicle based on the image captured by the camera;

matching the traveling direction of the vehicle obtained based on the image to the traveling direction of the vehicle obtained based on the satellite signal received from the vehicle;

matching the high definition map corresponding to the matched traveling direction of the vehicle to the captured image; and obtaining the attitude angle information of the camera based on a matching error between a landmark on the captured image and the high definition map.

14. The non-transitory computer-readable storage medium of claim 10, further comprising:

transforming a coordinate system of the image captured by the camera mounted on the vehicle, by using the obtained coordinate system transformation information.

* * * * *